US006783233B2

(12) United States Patent
Xie

(10) Patent No.: US 6,783,233 B2
(45) Date of Patent: *Aug. 31, 2004

(54) SPECTACLES SET WITH DETACHABLE SHELTER FRAME

(76) Inventor: Yiling Xie, 1009 Arcadia Ave., Suite 3, Arcadia, CA (US) 91007

( * ) Notice: Subject to any disclaimer, the term of this patent is extended or adjusted under 35 U.S.C. 154(b) by 0 days.

This patent is subject to a terminal disclaimer.

(21) Appl. No.: 10/278,497

(22) Filed: Oct. 24, 2002

(65) Prior Publication Data

US 2004/0080707 A1 Apr. 29, 2004

(51) Int. Cl.⁷ .................................................. G02C 9/00
(52) U.S. Cl. ......................................... 351/47; 351/57
(58) Field of Search ............................. 351/47, 57, 48, 351/58, 44

(56) References Cited

U.S. PATENT DOCUMENTS 6,402,318 B1 * 6/2002 Xiao ........................... 351/57
6,540,348 B1 * 4/2003 Xie ............................. 351/47

* cited by examiner

Primary Examiner—Hung Xuan Dang
(74) Attorney, Agent, or Firm—Raymond Y. Chan; David and Raymond Patent Group

(57) ABSTRACT

A spectacles set includes a primary spectacle frame which comprises a pair of magnetic holders at two nose supports thereof and a detachable shelter frame adapted for mounting in front of the primary spectacle frame. The detachable shelter frame includes a shelter frame for supporting two auxiliary lenses and a pair of magnetic attachment arrangements connected to the shelter frame. Each of the magnetic attachment arrangements includes a supporting arm extending rearwardly from the shelter bridge for riding over a primary bridge of the primary spectacle frame so as to securely mount the shelter frame in front of the primary spectacle frame and a magnetic seat which is connected to the supporting arm and extended to magnetically attach the magnetic holder of the primary spectacle frame so as to hold the shelter frame on the primary spectacle frame in position.

40 Claims, 12 Drawing Sheets

SPECTACLES SET WITH DETACHABLE SHELTER FRAME

BACKGROUND OF THE PRESENT INVENTION

1. Field of Invention

The present invention relates to spectacle frame, and more particularly to a spectacles set, which comprises a detachable shelter frame adapted for mounting on a primary spectacle frame by means of magnetic attraction.

2. Description of Related Arts

Shelter frames are widely used today. A conventional shelter frame, such as clip-on sunglasses, comprises a plurality of clipping claws for detachably mounted on a shortsighted or farsighted sunglasses so that the wearer does not need to carry and pay for another pair of shortsighted or farsighted sunglasses. However, the metal made clipping claws may scratch the lenses of the primary eyeglasses during the attaching operation. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, the magnet members are firmly affixed to the spectacle frame of the primary spectacle. Once the spectacle frame is accidentally bent its shape, the shelter frame may not precisely mounted on the primary spectacle by means of the magnet attachment. Furthermore, the spectacle frame of the primary spectacle must be altered to fit the magnet members thereto such that the magnet members will destroy the aesthetic appearance of the primary spectacle.

SUMMARY OF THE PRESENT INVENTION

A main object of the present invention is to provide a spectacles set which comprises a detachable shelter frame adapted for precisely and easily magnetically attaching on and detaching from a primary spectacle frame.

Another object of the present invention is to provide a spectacles set which comprises a detachable shelter frame adapted for precisely and easily mounting on a primary spectacle frame by means of magnetic attachment arrangement without the risk of scratching the lenses of the primary spectacle frame.

Another object of the present invention is to provide a spectacles set with detachable shelter frame, wherein the magnetic attachment arrangement is hidden behind the frame body of the primary spectacle frame and located at the nose supports of the primary spectacle frame so as to keep the aesthetic appearance of the primary spectacle frame.

Another object of the present invention is to provide a spectacles set with detachable shelter frame, wherein the nose supports are adapted to be adjusted their positions with respect to the primary spectacle frame in order to fit the wearer, the wearer may self-adjust the magnetic attachment arrangement to align with the detachable shelter frame even the shape of the primary spectacle frame is slightly distorted.

Another object of the present invention is to provide a spectacles set with detachable shelter frame, wherein two supporting arms of the magnetic attachment arrangement ride on a primary bridge of the primary spectacle, so as to support the detachable shelter frame and further prevent the downward and sideward movement of the detachable shelter frame with respect to the primary spectacle frame.

Another object of the present invention is to provide a spectacles set with detachable shelter frame, wherein the two supporting arms of the magnetic attachment arrangement are further extended downwardly to mount on the primary bridge of the primary spectacle so as to further prevent any frontward or rearward movement of the detachable shelter frame with respect to the primary spectacle frame.

Another object of the present invention is to provide a spectacles set, wherein the wearer may merely use one hand to attach or detach the detachable shelter frame during exercising or driving.

Another object of the present invention is to provide a spectacles set, which does not require to change the original structural design of the primary spectacle frame. It is another object in one embodiment of a spectacles set with detachable shelter frame of the present invention, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprising a primary spectacle frame and a detachable shelter frame adapted for mounting in front of the primary spectacle frame.

The primary spectacle frame comprises a frame body for mounting a pair of lenses in position, wherein the frame body comprises a primary bridge connected between the two lenses, two nose supports attached at two inner sides of the lenses respectively, two magnetic holders each of which has magnetic attraction ability being provided at the two nose supports respectively, and two side extensions provided at two outer sides of the lenses for coupling a pair of temples respectively.

The detachable shelter frame comprises a shelter frame for supporting two auxiliary lenses and a pair of magnetic attachment arrangements connected to the shelter frame, wherein each of the magnetic attachment arrangements comprises a supporting arm extending rearwardly from an inner side of the shelter frame towards the respective magnetic holder for riding on the primary bridge so as to securely mount the shelter frame in front of the primary spectacle frame and a magnetic seat which is connected to the supporting arm and extended to magnetically attach the respective magnetic holder of the primary spectacle frame so as to hold the shelter frame on the primary spectacle frame in position.

In a preferred embodiment of the present invention, the shelter frame includes a shelter bridge connected between the two auxiliary lenses and each of the supporting arms of the magnetic attachment arrangements has a riding portion rearwardly extended from the shelter bridge for riding on the primary bridge of the primary spectacle frame and a mounting portion downwardly extended from the riding portion to support the magnetic seat thereof to attach with respective magnetic holder of the primary spectacle frame.

DETAILED DESCRIPTION OF THE PREFERRED EMBODIMENT

Figure 1:
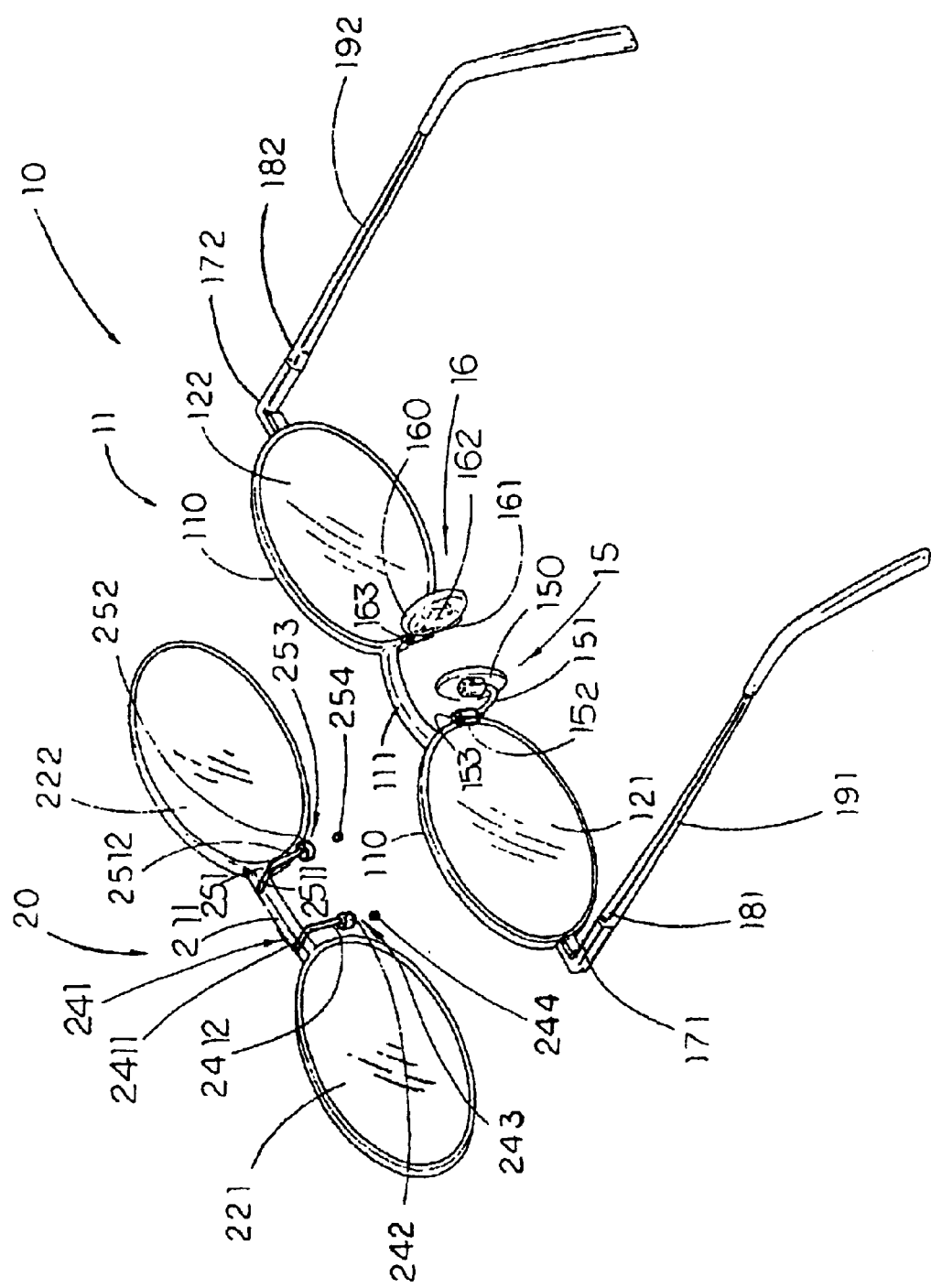
FIG. 1 is a rear perspective view of a spectacles set comprising a primary spectacle frame incorporated with a detachable shelter frame according to a preferred first embodiment of the present invention.

Referring to FIG. 1 of the drawings, a spectacles set according to a preferred embodiment of the present invention is illustrated, wherein the spectacles set comprises a primary spectacle frame 10 and a detachable shelter frame 20 adapted for detachably mounting in front of the primary spectacle frame 10.

The primary spectacle frame 10, such as a conventional spectacle frame, comprises a frame body 11 for mounting a pair of lenses 121, 122 in position. The frame body 11 comprises a primary bridge 111 connected between the two lenses 121, 122 respectively, two nose supports 15, 16 are attached to two inner sides of the lenses 121, 122 respectively, and two side extensions 171, 172 provided at two outer sides of the lenses 121, 122 respectively wherein each of the two side extensions 171, 172 has a hinge portion 181, 182 extended rearwardly therefrom for pivotally coupling a temple 191, 192.

Each of the nose supports 15, 16 includes a supporting member 150, 160 and an extension arm 151, 161 which has a distal end portion detachably connected to the supporting member 150, 160 and a root end portion integrally attached to the primary spectacle frame 10. As shown in FIG. 1, each of the root end portions of the extension arms 151, 161 forms a magnetic holder 152, 162 having a magnetic attraction ability.

The frame body 11 of the primary spectacle frame 10 can be constructed as the conventional spectacle frame to have a pair of lens rims 110, as shown in FIG. 1, or the rimless frame that the primary bridge 111 and two side extensions 171, 172 are directly fastened to the edges of the two lenses 121, 122.

According to the preferred embodiment as shown in FIG. 1, the two extension arms 151, 161 are integrally and rearwardly extended from the frame body 11 wherein each of the magnetic holders 152, 162 is provided at the two root end portions of the extension arms 151, 161 of the nose supports 15, 16 respectively. In other words, the primary spectacle frame 10 does not require modifying its original structure for mounting the detachable shelter frame 20 thereon.

At least a top portion of each of the magnetic holders 152, 162 is made of a kind of metal having magnetic attraction ability such as mild steel, low carbon steel and high grade steel, which is attractive to magnetic material such as permanent magnet. According to preferred embodiment, each of the magnetic holders 152, 162 further comprises an interlocking member 153, 163 upwardly protruded, which can be a magnet planted on top of the respectively magnetic holder 152, 162 or integrally formed with the respective magnetic holder 152, 162 by such magnetic attracting metal.

The detachable shelter frame 20 comprises a shelter frame 21 for supporting two auxiliary lenses 221, 222. The shelter frame 21 comprises a shelter bridge 211 extended between the two auxiliary lenses 221, 222 and a pair of magnetic attachment arrangements 24, 25 connected to the shelter frame 21 for holding the shelter frame 21 in front of the primary spectacle frame 10 in position.

As shown in FIG. 1, each of the magnetic attachment arrangement 24, 25 comprises a supporting arm 241, 251 extending rearwardly from the shelter frame 21 to a position towards the respective magnetic holder 152, 162 of the primary spectacle frame 10 when the detachable shelter frame 20 is mounted in front of the primary spectacle frame 10, and a magnetic seat 242, 252 which is connected to the supporting arm 241, 242 and arranged to magnetically attach to the magnetic holder 152, 162 of the primary spectacle frame 10 so as to hold the shelter frame 21 of the detachable shelter frame 20 on the frame body 11 of the primary spectacle frame 10 in position.

Each of the magnetic seats 242, 252 comprises a magnetic housing 243, 253 rearwardly extended from the respective supporting arm 241, 251 wherein each magnetic seat 242, 252 is made of non-magnetic material or soft-magnetic metal having magnetic attraction ability such as mild steel, low carbon steel and high grade steel and a magnet 244, 254 mounted in the magnetic housing 243, 253, which is arranged to face toward and align with the respective magnetic holder 152, 162 of the shelter frame 21 when the detachable shelter frame 20 is mounted in front of the primary spectacle frame 10.

According to the preferred embodiment, the two supporting arms 241, 251 are in L-shaped and extended from two end portions of the shelter bridge 211, wherein each of the supporting arms 241, 251 comprises a riding portion 2411, 2511 rearwardly extended from the shelter bridge 211 to ride on the primary bridge 111 and a mounting portion 2412, 2512 downwardly and integrally extended from a rear end of the respective riding body 2411, so that the riding portions of the supporting arms 241, 251 are capable of substantially riding on the primary bridge 111 when the detachable shelter frame 20 is mounted in front of the primary spectacle frame 10 so as to support the detachable shelter frame 20 and further prevent any downward and sideward movement of the detachable shelter frame 20 with respect to the primary spectacle frame 10. In addition, the two mounting portions 2412, 2512 of the two supporting arms 241, 251 of the magnetic attachment arrangement 24, 25 are further extended downwardly to mount on the primary bridge 111 of the primary spectacle that may further prevent any frontward or rearward movement of the detachable shelter frame 20 with respect to the primary spectacle frame 10, so that besides the magnetic attachment between the two magnetic seats 242, 252 and the two magnetic holders 152, 162 respectively, the detachable shelter frame 20 can further be securely mounted and supported on the primary spectacle frame 10.

Figure 2:
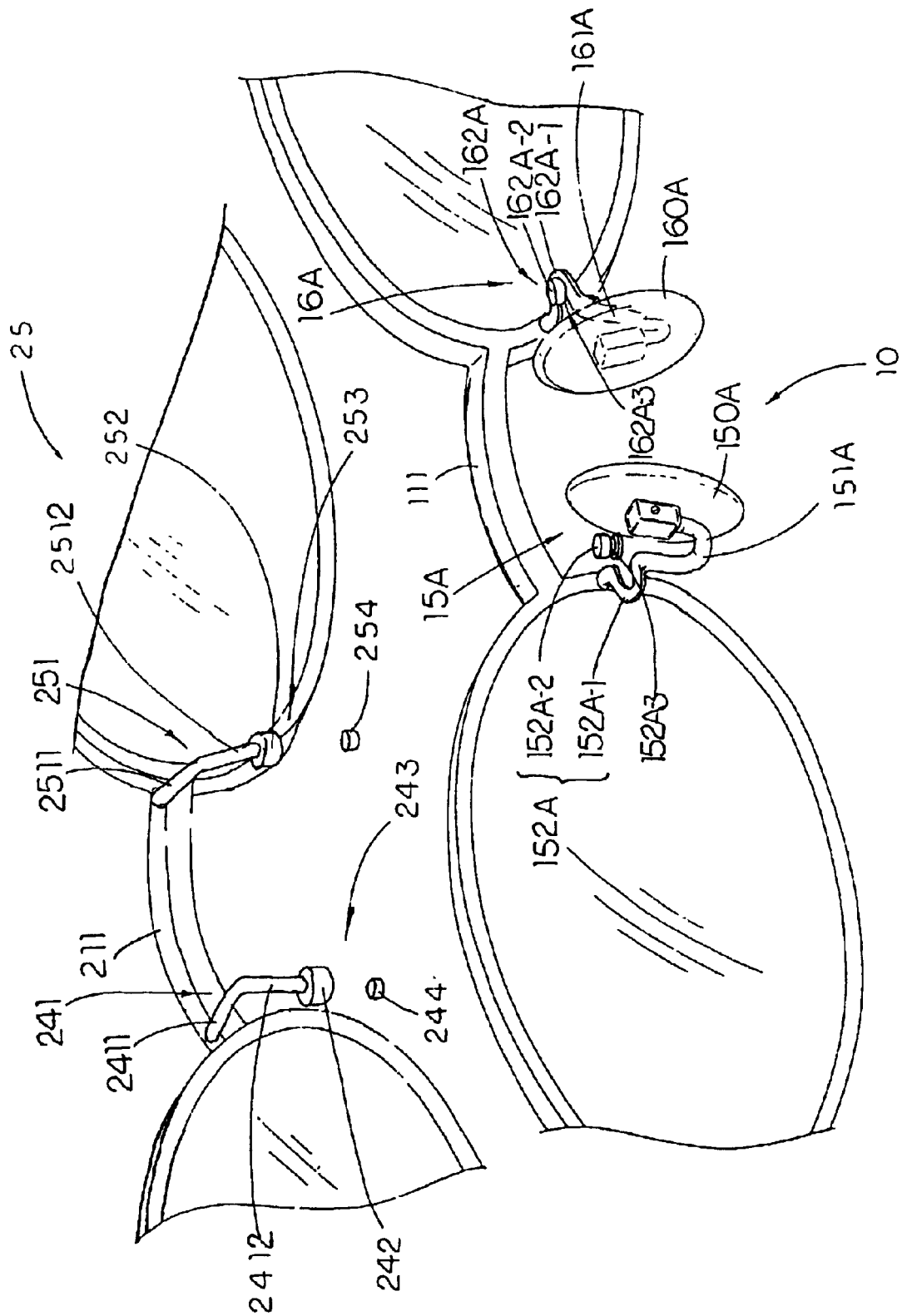
FIG. 2 is a partial enlarged perspective view of a spectacles set with detachable shelter frame according to a first alternative mode of the above first preferred embodiment of the present invention.
Figure 3:
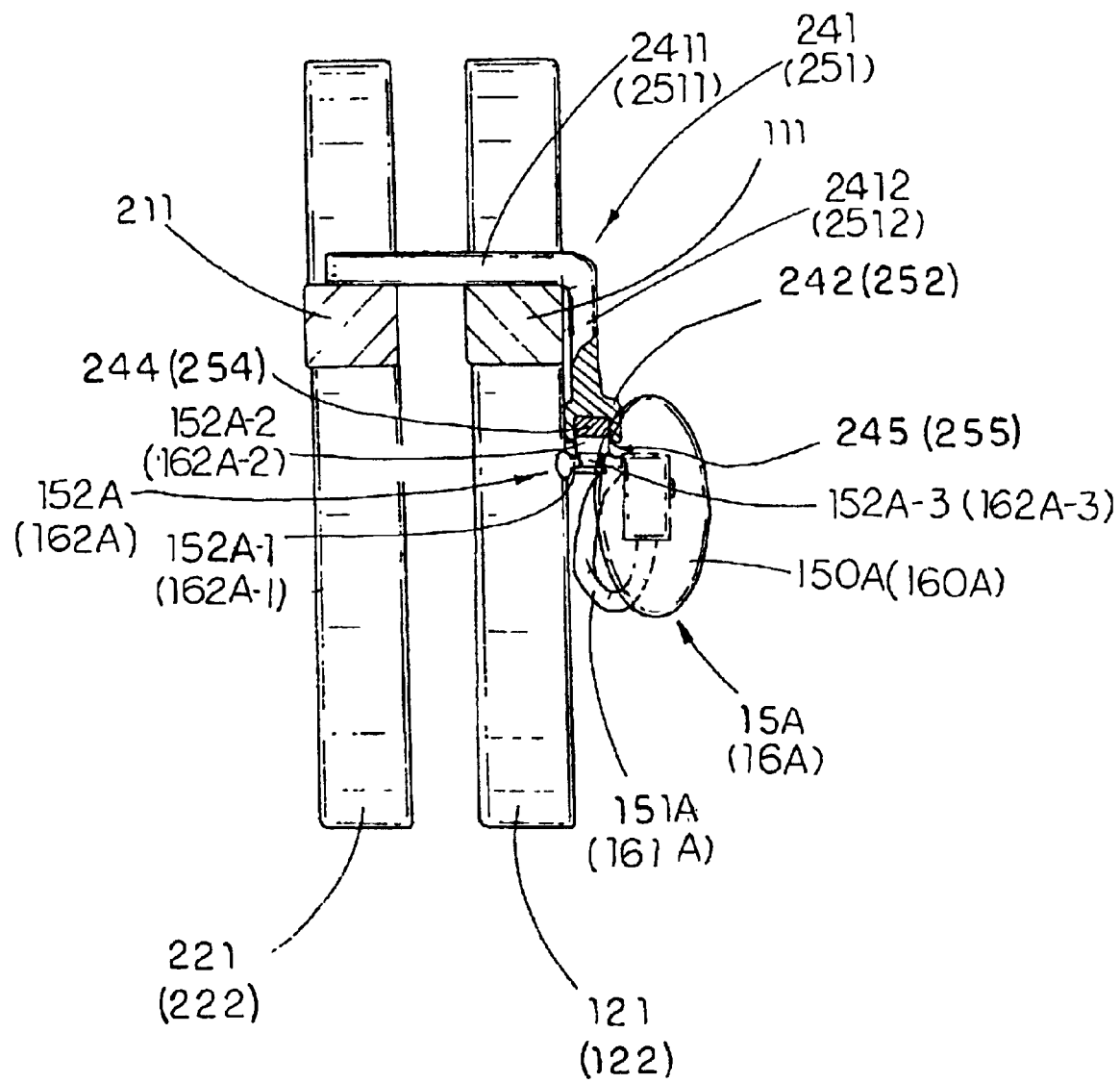
FIG. 3 is a sectional view of the detachable shelter frame mounted in front of the primary spectacle frame according to the first alternative mode of the above preferred embodiment of the present invention.

Referring to FIGS. 2 and 3, a first alternative mode of the above preferred embodiment is illustrated, which magnetic attachment arrangements 24, 25 are the same as the above preferred embodiment. However, each of the two nose supports 15A, 16A alternatively comprises a supporting member 150A, 160A and a magnetic holder 152A, 162A which comprises a holder member 152A-1, 162A-1 and a magnetic member 152A-2, 162A-2. The two holder members 152A-1, 162A-1 are formed by horizontally extending and bending the two root end portions of the extension arms 151A, 161A of the nose supports 15A, 16A to form two U-shaped loop portions respectively. The two magnetic members 152A-2, 162A-2 are made of either magnets or a kind of metal having magnetic attraction ability such as mild steel, low carbon steel and high grade steel that is attractive to magnetic material such as permanent magnet. Each of the magnetic members 152A-2, 162A-2 has a narrowed neck 152A-3, 162A-3 for engaging between two arms of the respective U-shaped loop portion, i.e. the holder members 152A-1, 162A-1.

According to the preferred embodiment and the first alternative mode thereof, each magnet 244, 254 has a thickness smaller than a depth of the respective magnetic housing 243, 253 so as to define an engaging groove 245, 255, as shown in FIG. 3, when the magnet 244, 254 is embedded in the magnetic housing 243, 253 for fittedly engaging with the interlocking member 153, 163 or the magnetic member 153A, 163A of the respective magnetic holder 152, 162, 152A, 162A. In other words, the two interlocking members 153, 163 or the magnetic members 153A, 163A are received in the two engaging grooves 245, 255, so as to further guide the two magnetic attachment arrangement 24, 25 to magnetically attach to the two magnetic holder 152, 162, 152A, 162A.

Figure 4:
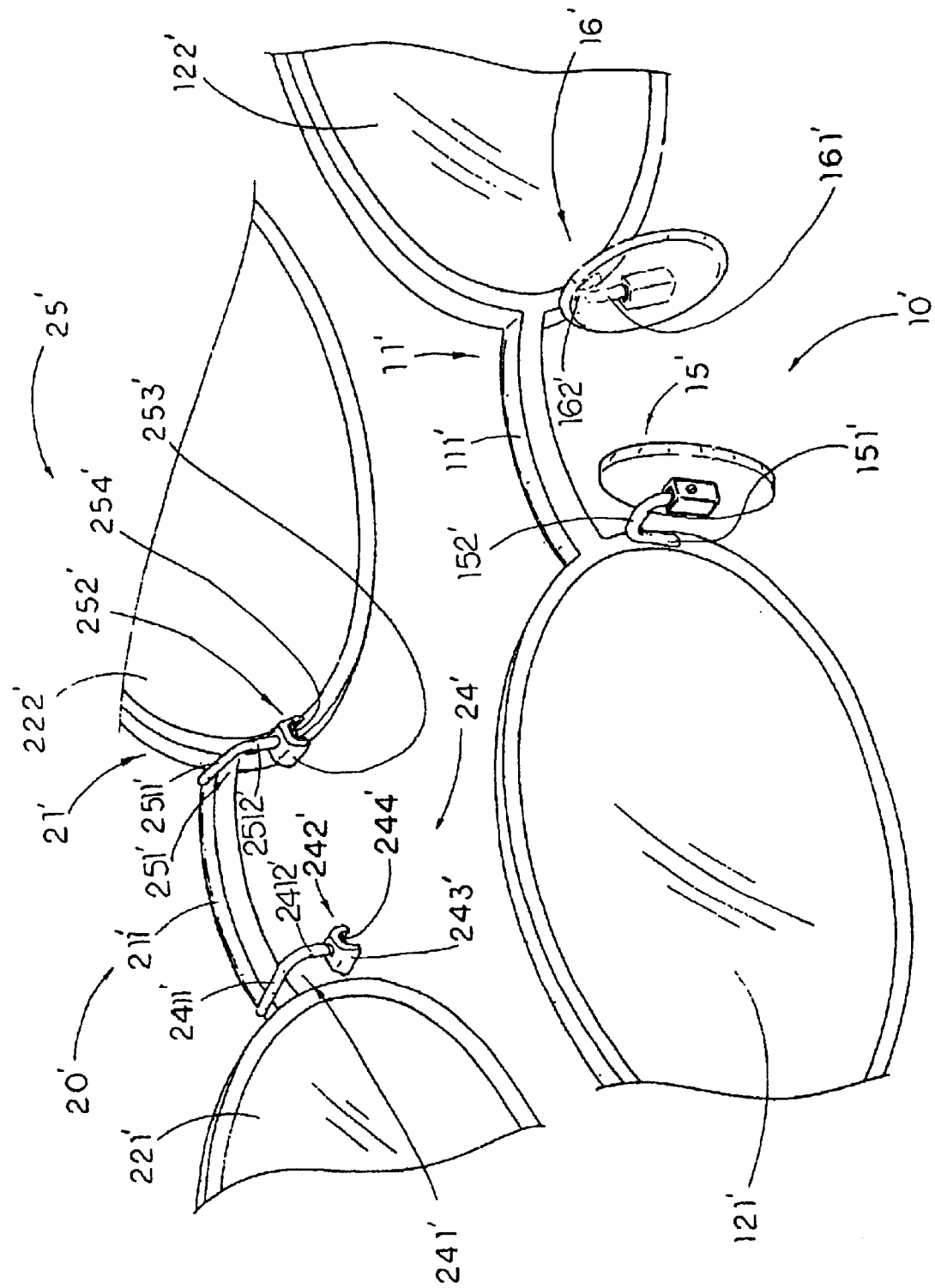
FIG. 4 is a partial perspective view of a spectacles set with detachable shelter frame according to a second alternative mode of the above preferred embodiment of the present invention.
Figure 5:
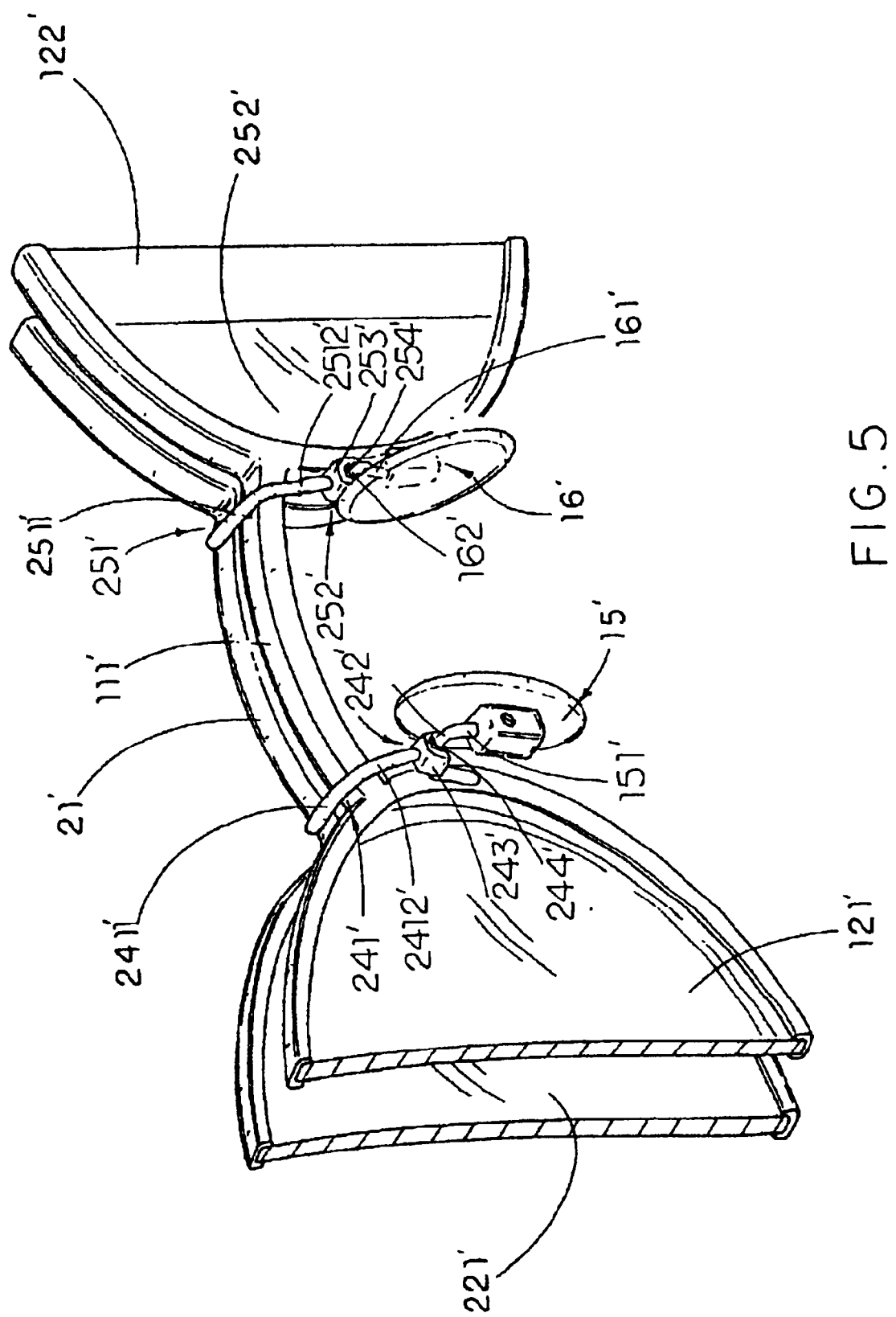
FIG. 5 is a partial rear perspective view of the detachable shelter frame mounted on the primary spectacle frame according to the second alternative mode of the above preferred embodiment of the present invention.

Referring to FIGS. 4 and 5, a second alternative mode of the above preferred embodiment of the present invention is illustrated. The primary spectacle frame 10' has the same structure except the two magnetic holders 152', 162' are alternatively made from the two extension arms 151', 161'respectively, wherein each of the extension arms 151', 161' is made in reverse U-shape to form two top shoulders to function as the two magnetic holders 152', 162' respectively.

Correspondingly, the detachable shelter frame 20' also comprises a shelter frame 21' for supporting two auxiliary lenses 221', 222' and a pair of magnetic attachment arrangements 24', 25' connected to the shelter frame 21' wherein each of the magnetic attachment arrangements 24', 25' comprises a supporting arm 241', 251' extending rearwardly from a shelter bridge 211' of the shelter frame 21' for riding on the primary bridge 111 so as to securely mount the shelter frame 21' in front of the primary spectacle frame 10 and a magnetic seat 242', 252' which is connected to the supporting arm 241', 251' and arranged to magnetically attach to the magnetic holder 151', 161' of the primary spectacle frame 10' so as to hold the shelter frame 21' of the detachable shelter frame 20' on the frame body 11' of the primary spectacle frame 10' in position.

As shown in FIG. 4, each of the supporting arms 241', 251' has a L-shaped and comprises a riding portion 2411', 2511' rearwardly extended from the shelter bridge 211' to ride on the primary bridge 111' of the frame body 10' and a mounting portion 2412', 2512' downwardly and integrally extended from a rear end of the respective riding portion 2411', 2511' towards the magnetic holders 152', 162' of the primary spectacle frame 10' respectively. In other words, when the shelter frame 21' is mounted in front of the primary spectacle frame 10', the riding portions 2411', 2511' of the supporting arms 241', 251' ride over the primary bridge 111' while the mounting portions 2412', 2512' downwardly extend behind the primary bridge 111' and toward the magnetic holders 152', 162' respectively, so as to mount the detachable shelter frame 20' in front of the primary spectacle frame 10'.

As shown in FIG. 5, the magnetic seats 242', 252' are connected to bottom ends of the mounting portions 2412', 2512' of the supporting arms 241', 251' respectively to magnetically attach to the magnetic holders 152', 162' of the primary spectacle frame 10'. Accordingly, the two supporting arms 241', 251' also function as a bridge clip to ride on top of the primary bridge 111' of the frame body 11' for engaging with the primary bridge 111' so as to securely interlock the shelter frame 21' in front of the primary spectacle frame 10' by preventing any upward, downward, leftward, and rightward movement of the shelter frame 21'.

Each of the magnetic seats 242', 252' comprises a magnetic housing 243', 253' downwardly and suspendedly affixed to the bottom end of the mounting portion 2412' of the respective supporting arm 241', 251', wherein each magnetic housing 243', 253' is a reverse U-shaped body defining an engaging groove 245', 255'. Each of the magnetic housing 243', 253' is made of non-magnetic material or soft-magnetic metal having magnetic attraction ability such as mild steel, low carbon steel and high grade steel.

Each of the magnetic seats 242', 252' further comprises a magnet 244', 254' mounted at the bottom of the engaging groove 245', 255' of the magnetic housing 243', 253'. In order to mount the detachable shelter frame 20' in front of the primary spectacle frame 10', the magnetic seats 242', 252' are attached to the two magnetic holders 152', 162' by engaging the two top shoulders of the two magnetic holders 152', 162' in the two engaging grooves 245', 255' respectively. In addition, when the magnets 244', 254' are mounted in the magnetic housing 243', 253', the magnet fields present around the two magnets 244', 254' not only guide the magnetic seats 242', 252' toward and align with the magnetic holders 152', 162' but also ensure the magnetic seats 242', 252' firmly attached with the magnetic holders 152', 162', as shown in FIG. 5.

Figure 6:
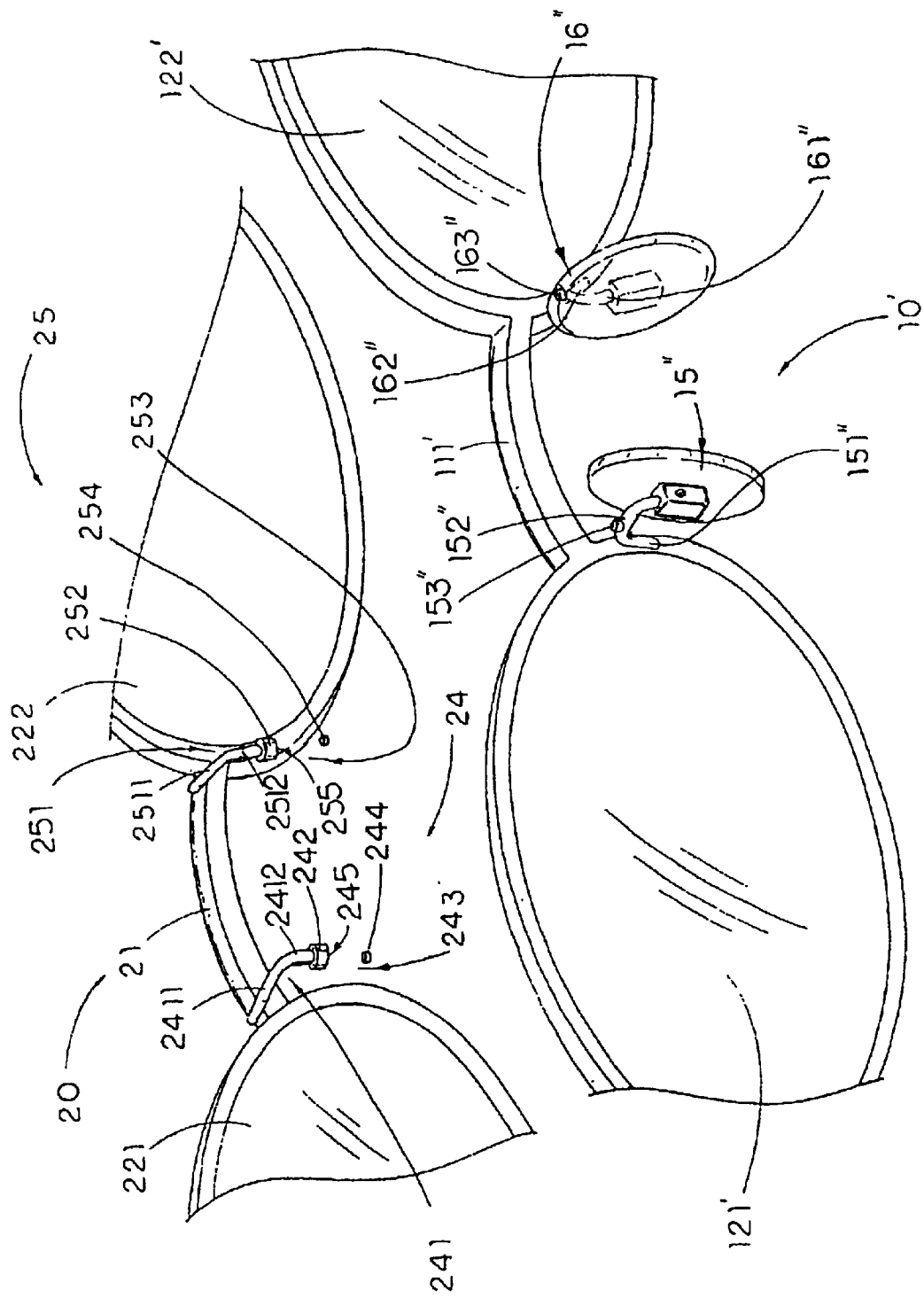
FIG. 6 is a partial perspective view of a spectacles set with detachable shelter frame according to a third alternative mode of the above preferred embodiment of the present invention.

Referring to FIG. 6, a third alternative mode of the above preferred embodiment of the present invention is illustrated, which is a combination of the above preferred embodiment and its second alternative mode, wherein the two magnetic attachment arrangements 24, 25 of the third alternative mode as shown in FIG. 6 are the same as the above preferred embodiment as shown in FIGS. 1 and 2 and the two magnetic holders 152", 162" of the two nose supports 15", 16" are similar to the above second alternative mode as shown in FIGS. 4 and 5. In addition, two engaging members 153", 163" made of magnetically attachable material are upwardly protruded on the two reverse U-shaped top shoulder of the two magnetic holders 152", 162" respectively.

Similarly, each magnet 244, 254 has a thickness smaller than a depth of the respective magnetic housing 243, 253 so as to define an engaging groove 245, 255 at a bottom end of the respective magnetic housing 243, 253, so that the magnet 244, 254 is embedded in the magnetic housing 243, 253 for fittedly engaging with the respective engaging member 153", 163". In other words, the magnetic holders 152", 162" are received in the two engaging grooves 245, 255 respectively to further guide the two magnetic attachment arrangements 24, 25 to magnetically attach to the two magnetic holders 152", 162" respectively.

Figure 7:
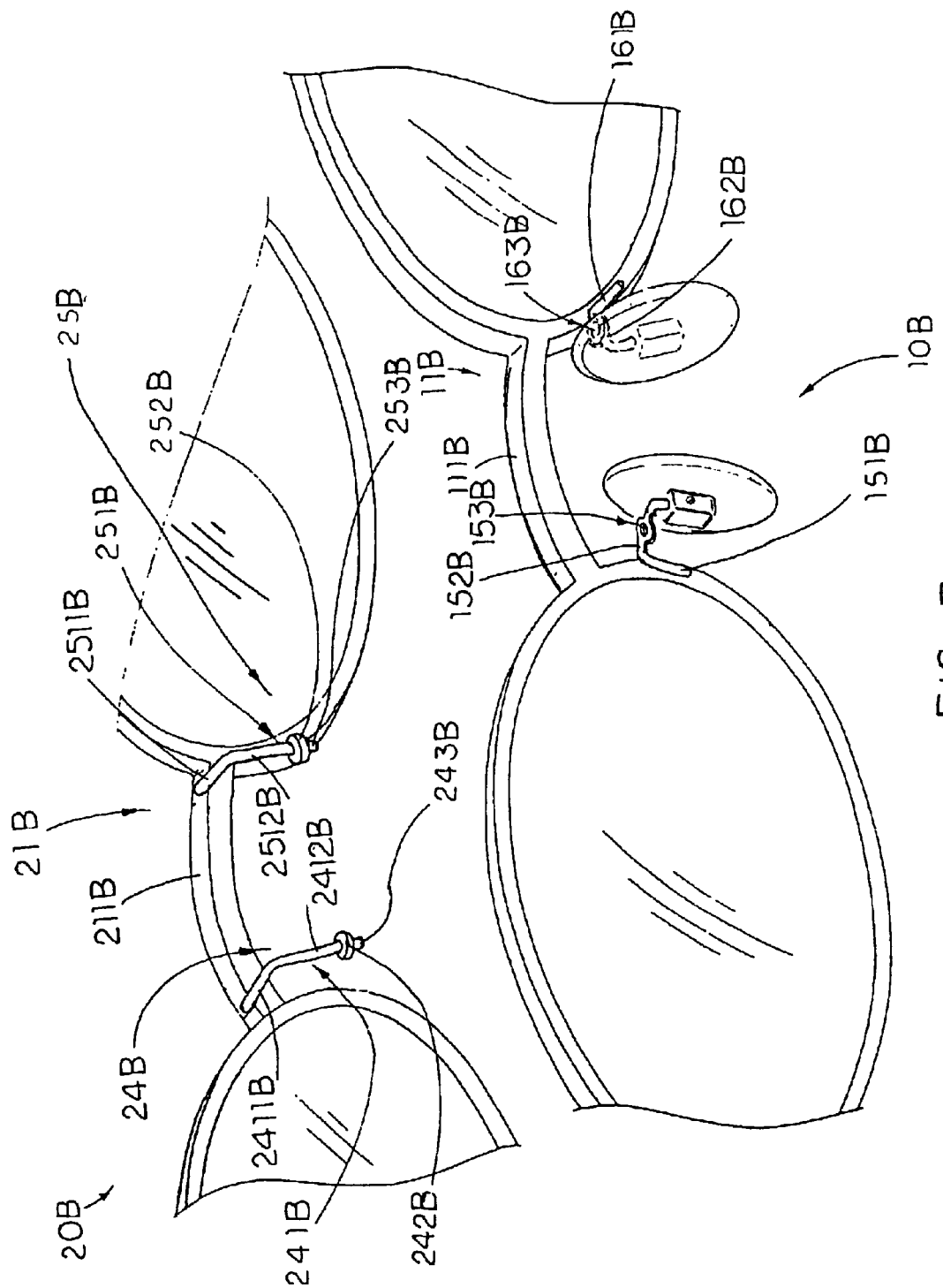
FIG. 7 is a partial perspective view of a spectacles set with detachable shelter frame according to a fourth alternative mode of the above preferred embodiment of the present invention.

Referring to FIG. 7, a fourth alternative mode of the above preferred embodiment of the present invention is illustrated, wherein the magnetic holders 152B, 162B are also made from the two extension arms 151B, 161B respectively, wherein each of the extension arms 151B, 161B is made in reverse U-shape to form a top shoulder to function as the magnetic holder 152B, 162B. However, the two top shoulders of the magnetic holders 152B, 162B according to the fourth alternative mode are embodied as ring shape holders made of magnetically attractable materials as described above, wherein a holder hole 153B, 163B is formed on each of the magnetic holders 152B, 162B.

Correspondingly, each of the two magnetic attachment arrangements 24B, 25B comprises a supporting arm 241B, 251B extended rearwardly from the shelter bridge 211B of the shelter frame 21B for riding on the primary bridge 111B so as to securely mount the shelter frame 21B in front of the primary spectacle frame 10B and a magnetic seat 242B, 252B which is a magnet and connected to the supporting arm 241B, 251B and arranged to magnetically attach to the magnetic holder 152B, 162B of the primary spectacle frame 10B so as to hold the shelter frame 21B of the detachable shelter frame 20B on the frame body 11B of the primary spectacle frame 10B in position.

Each of the magnetic seats 242B, 252B further comprises an engagement tip 243B, 253B integrally protruded from a bottom end thereof, wherein each of the engagement tips 243B, 253B has a diameter smaller than the magnetic seat 242B, 252B and slightly smaller than the holder hole 153B, 163B. The engagement tips 243B, 253B can be made of magnets. The engagement tips 243B, 253B can also be made of metal having magnetic attraction ability, such as mild steel, low carbon steel and high grade steel, when the magnetic seats 242B, 252B are made of magnet.

Similarly, when the shelter frame 21B is mounted in front of the primary spectacle frame 10B, the riding portions 2411B, 2511B of the supporting arms 241B, 251B ride over the primary bridge 111B while the mounting portions 2412B, 2512B downwardly extend behind the primary bridge 111B and toward the magnetic holders 152B, 162B respectively, so as to mount the detachable shelter frame 20B in front of the primary spectacle frame 110B, wherein the two magnetic seats 242B, 252B magnetically attract with the two magnetic holders 152B, 162B respectively and, in addition, the two engagement tips 243B, 253B are inserted into the two holder holes 153B, 163B respectively so as to firmly engaged the magnetic holders 152B, 162B with the two magnetic holders 152B, 162B, so that the detachable shelter frame 20B can be firmly attached to the primary spectacle frame 10B that avoids any sideward movement of the detachable shelter frame 20B with respect to the primary spectacle frame 10B until the shelter frame 21B is manually lifted up to detach from the primary spectacle frame 10B.

Figure 8:
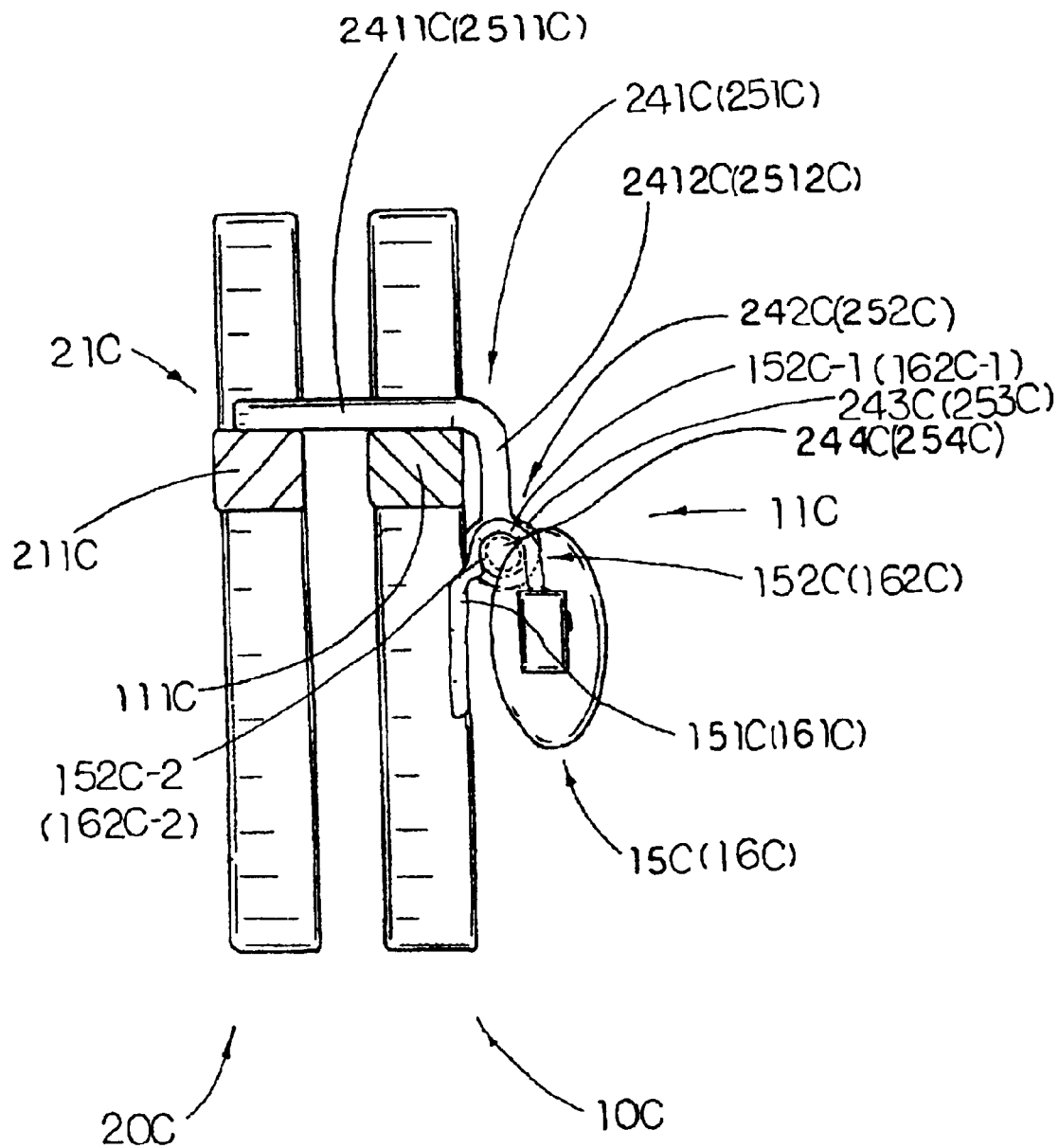
FIG. 8 is a sectional side view of a spectacles set with detachable shelter frame according to a fifth alternative mode of the above preferred embodiment of the present invention.

Referring to FIG. 8, a fifth alternative mode of the above preferred embodiment of the present invention is illustrated, wherein the magnetic holders 152C, 162C of the two nose supports 15C, 16C are also made from the two extension arms 151C, 161C respectively, wherein each of the extension arms 151C, 161C has a reverse U-shape that forms an upper loop portion. Each of the magnetic holders 152C, 162C comprises a holder member 152C-1, 162C-1 which is the reversed U-shaped upper loop portion of the extension arm 151C, 161C and a magnetic member 151C-2, 161C-2 firmly mounted on the respective holder member 152C-1, 162C-1.

The two magnetic members 152C-2, 162C-2 are circular bodies made of either magnets or a kind of metal having magnetic attraction ability. The holder members 152C-1, 162C-1 are engaged around the magnetic members 152C-2, 162C-2 so as to support the two magnetic members 152C-2, 162C-2 in position wherein an attraction surface of each of the magnetic members 152C-2, 162C-2 is facing outwards. Each of the magnetic members 152C-2, 162C-2 can be adjusted to a vertical position or an inclined position with a desired angle by bending the respective extension arms 151C, 161C.

Correspondingly, each of the two magnetic attachment arrangements 24C, 25C comprises a supporting arm 241C, 251C extended rearwardly from the shelter bridge 21 1C of the shelter frame 21C for riding on the primary bridge 111C so as to securely mount the shelter frame 21C in front of the primary spectacle frame 10C and a magnetic seat 242C, 252C connected to the supporting arm 241C, 251C. Each of the magnetic seats 242C, 252C comprises a magnetic housing 243C, 253C and a magnet 244C, 254C embedded in the magnetic housing 243C, 253. Corresponding to the vertical or inclined position of the two magnetic holders 152C, 162C, the magnetic seats 242C, 252C are supported either vertically or inclinedly with the magnets 244C, 254C facing inwards to magnetically attach to the attraction surfaces of the two magnetic members 152C-2, 162C-2 of the two magnetic holders 152C, 162C of the primary spectacle frame 10C so as to hold the shelter frame 21C of the detachable shelter frame 20C on the frame body 11C of the primary spectacle frame 10C in position.

Similarly, when the shelter frame 21C is mounted in front of the primary spectacle frame 10C, the riding portions 2411C, 2511C of the supporting arms 241C, 251C ride over the primary bridge 111C while the mounting portions 2412C, 2512C downwardly extend behind the primary bridge 111C and toward the magnetic holders 152C, 162C respectively, so as to mount the detachable shelter frame 20C in front of the primary spectacle frame 10C while the two magnetic seats 242C, 252C magnetically attract with the two magnetic holders 152C, 162C respectively.

Figure 9:
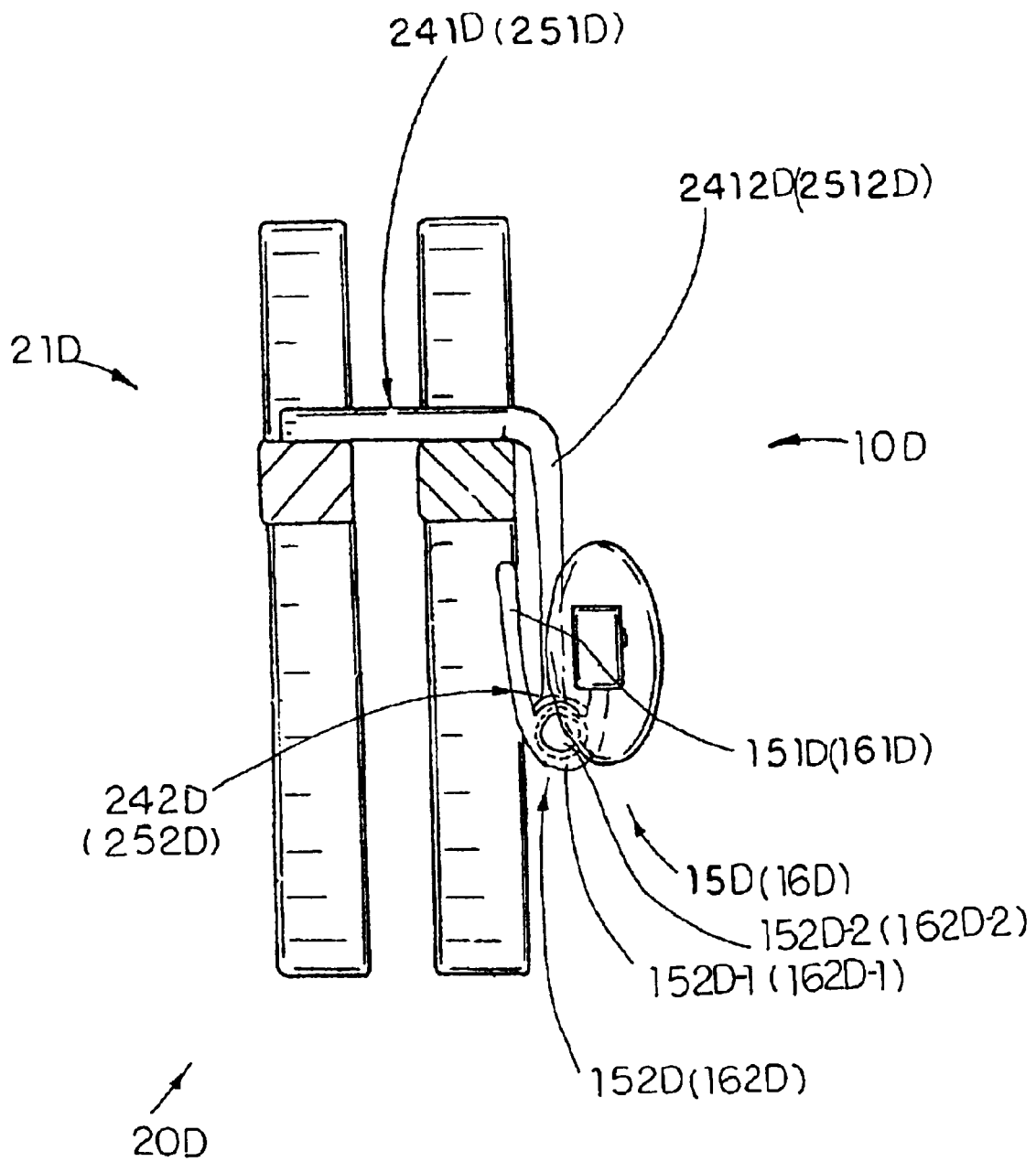
FIG. 9 is a sectional side view of a spectacles set with detachable shelter frame according to a sixth alternative mode of the above preferred embodiment of the present invention.

Referring to FIG. 9, a sixth alternative mode of the above preferred embodiment of the present invention is illustrated, which has a similar structure of the above fifth alternative mode except the magnetic holders 152D, 162D which are made from the two extension arms 151D, 161D respectively are arranged in a bottom position of the two nose supports 15D, 16D. In which, each of the extension arms 151D, 161D of the nose supports 15D, 16D of the primary spectacle frame 10D has a U-shape that forms a lower loop portion. Similarly, each of the magnetic holders 152D, 162D comprises a holder member 152D-1, 162D-1 which is the U-shaped lower loop portion of the extension arm 151D, 161D and a magnetic member 151D-2, 161D-2 firmly mounted on the respective holder member 152D-1, 162D-1.

Correspondingly, the two magnetic seats 242D, 252D of the shelter frame 21D of the detachable shelter frame 20D, each having the same structure as that of the above fifth alternative mode as shown in FIG. 8, is lowered from the two mounting portions 2412D, 2512D of the two supporting arms 241D, 251D to effectively attract with the two magnetic holders 152D, 162D respectively.

Figure 10:
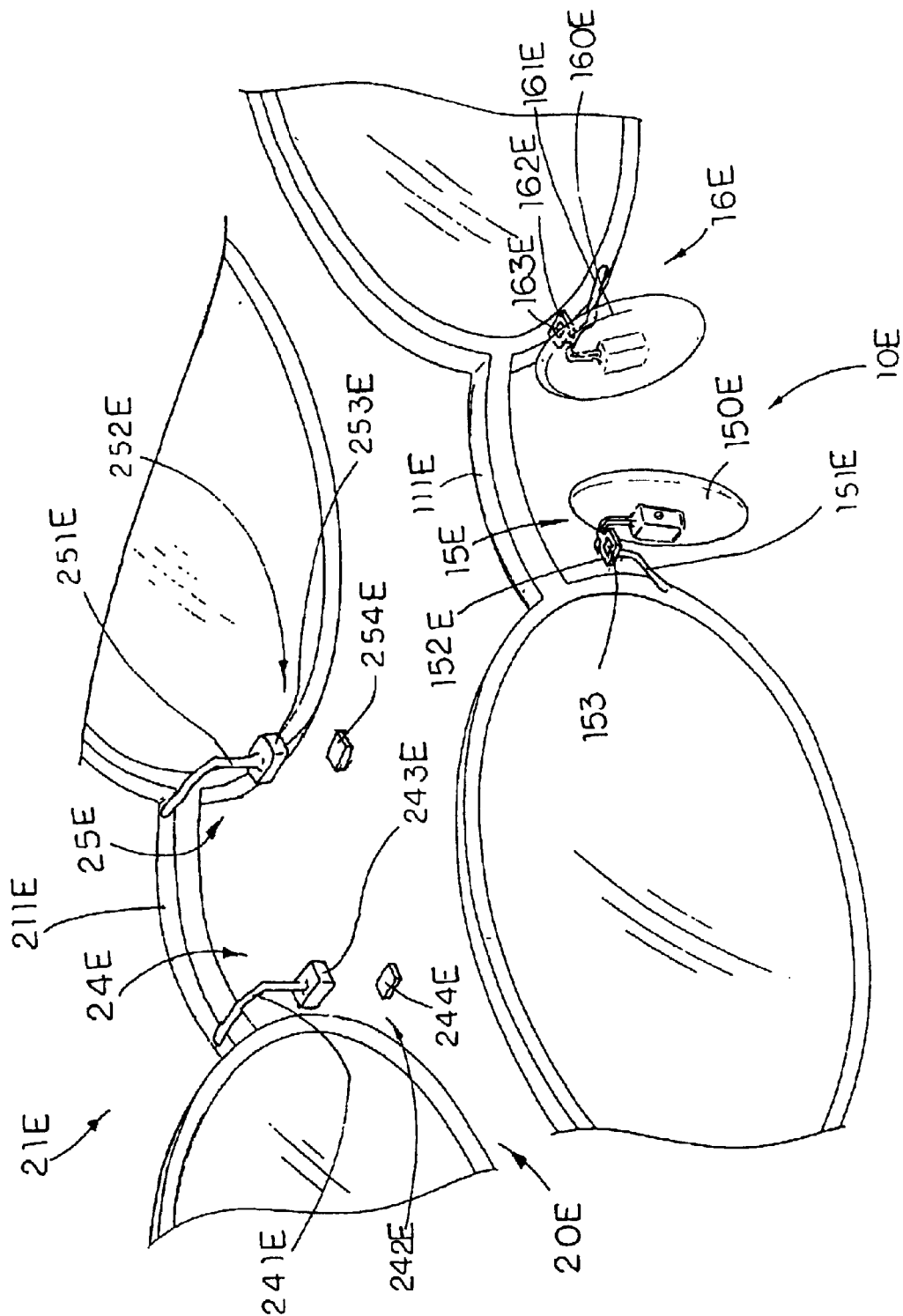
FIG. 10 is a partial perspective view of a spectacles set with detachable shelter frame according to a seventh alternative mode of the above preferred embodiment of the present invention.

Referring to FIG. 10, a seventh alternative mode of the above preferred embodiment is illustrated, which magnetic attachment arrangements 24E, 25E are similar to the above preferred embodiment except being embodied in rectangular shape. Each of the magnetic attachment arrangements 24E, 25E includes a supporting arm 241E, 251E and a magnetic seat 242E, 252E integrally extended from the supporting arm 241E, 251E, wherein each of the magnetic seats 242E, 252E comprises a magnetic housing 243E, 253E and a magnet 244E, 254E received therein. Each of the two nose supports 15E, 16E comprises a supporting member 150E, 160E and an extension arm 151E, 161E extended between the supporting member 150E, 160E and the primary spectacle frame 10E for supporting the supporting member 150E, 160E.

However, the two magnetic holders 152E, 162E are provided at an upper portion of the two extension arms 151E, 161E of the two nose supports 15E, 16E. Each of the magnetic holders 152E, 162E is a small holder member integrally connected to the upper portion of the respective extension arm 15E, 16E and has an attraction surface facing upwards. The magnetic holders 152E, 162E can be made of magnets or a kind of metal having magnetic attraction ability with magnets. Therefore, to securely mount the shelter frame 21E in front of the primary spectacle frame 10E, the supporting arms 241E, 251E extend rearwardly from the shelter bridge 211E of the shelter frame 21E of the detachable shelter frame 20E for riding on the primary bridge 11E of the primary spectacle frame 10E and the two magnetic seats 242E, 252E are magnetically attracted with the two magnetic holders 152E, 162E.

When the magnetic holders 152E, 162E is made of non-magnetic material, a magnet 153E, 163E can be embedded on each of the magnetic seats 152E, 162E for magnetically attracting with the magnetic seats 242E, 252E.

Figure 11:
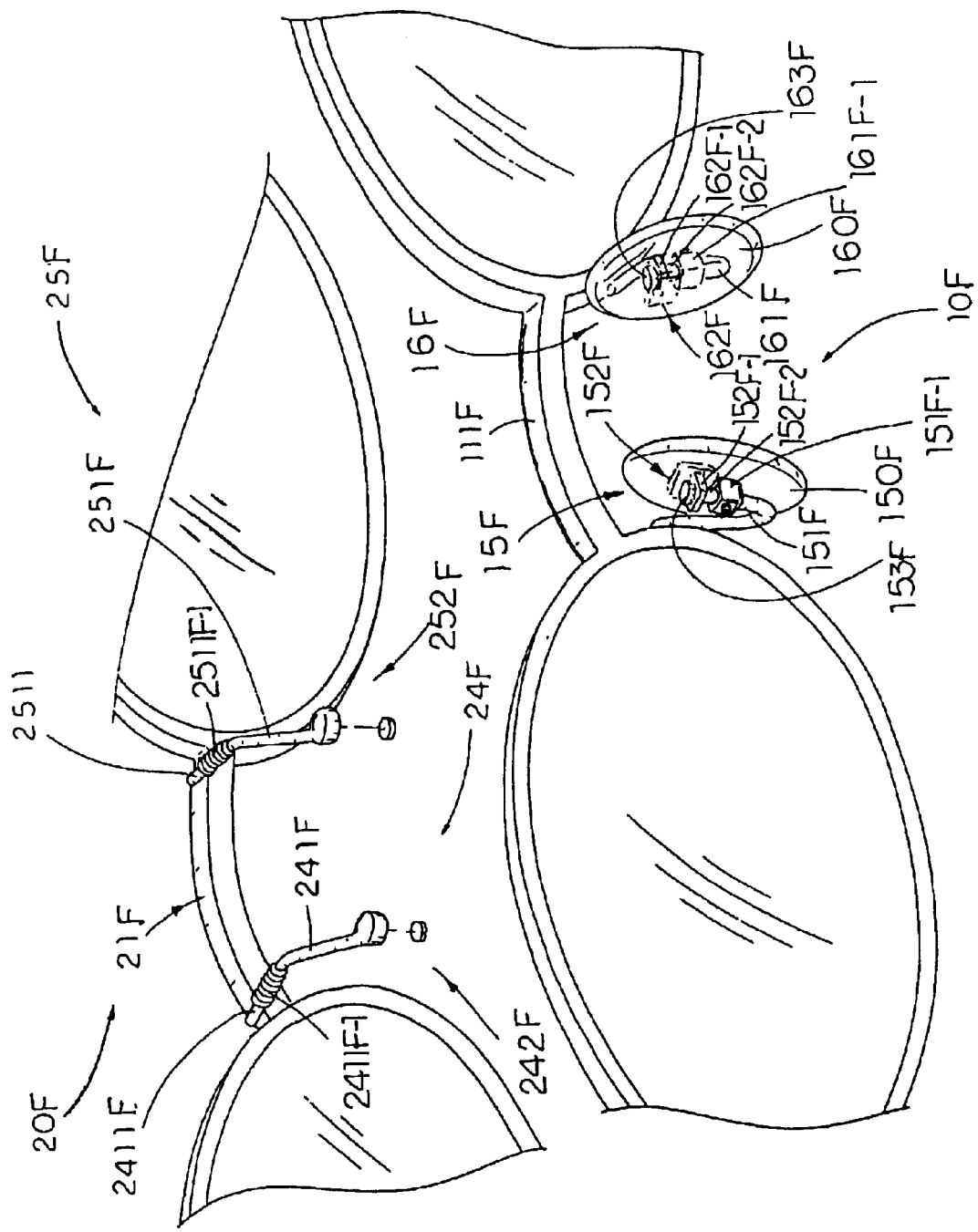
FIG. 11 is a partial perspective view of a spectacles set with detachable shelter frame according to an eighth alternative mode of the above preferred embodiment of the present invention.

Referring to FIG. 11, an eighth alternative mode of the above preferred embodiment of the present invention is illustrated, wherein the two magnetic attachment arrangements 24F, 25F of the shelter frame 21F of the detachable shelter frame 20F are same of the above preferred embodiment except that each of the two riding portions 2411F, 2511F comprises a section of elastic element 2411F-1, 2511F-1 to provide elastic ability for better holding the detachable shelter frame 20F in position by pulling the detachable shelter frame 20F towards the primary spectacle frame 10F after the detachable shelter frame 20F is mounted in front of the primary spectacle frame 10F.

The magnetic holders 152F, 162F of the eighth alternative mode as shown in FIG. 11 are alternatively modified from the above preferred embodiment, wherein the magnetic holders 152F, 162F are built in the two supporting members 150F, 160F of the two nose supports 15F, 16F respectively so that when the two supporting members 150F, 160F are fastened to the end holders 151F-1, 161F-1 of the two extension arms 151F, 161F respectively, the two magnetic holders 152F, 162F are also provided at an upper portion of the nose supports 15F, 16F.

As shown in FIG. 11, each of the magnetic holders 152F, 162F comprises a holder member 152F-1, 162F-2 protruded from an inner side of the respective supporting member 150F, 160F and a connecting member 152F-2, 162F-2 for detachably fastening to the respective end holder 151F-1, 161F-1. When the holder members 152F-1, 162F–I are made of magnetic attraction material, the magnetic seats 242F, 252F can be attracted thereto corresponding. In addition, each of the magnetic holders 152F, 162F further comprises an interlocking member 153F, 163F upwardly protruded from the holder member 152F-1, 162F-i for further engaging with the magnetic seats 242F, 252F.

In view of above, a conventional spectacle frame can be used as the primary spectacle frame 10F of the present invention by using the supporting members 150F, 160F that provide with the magnetic holders 142F, 152F.

Figure 12:
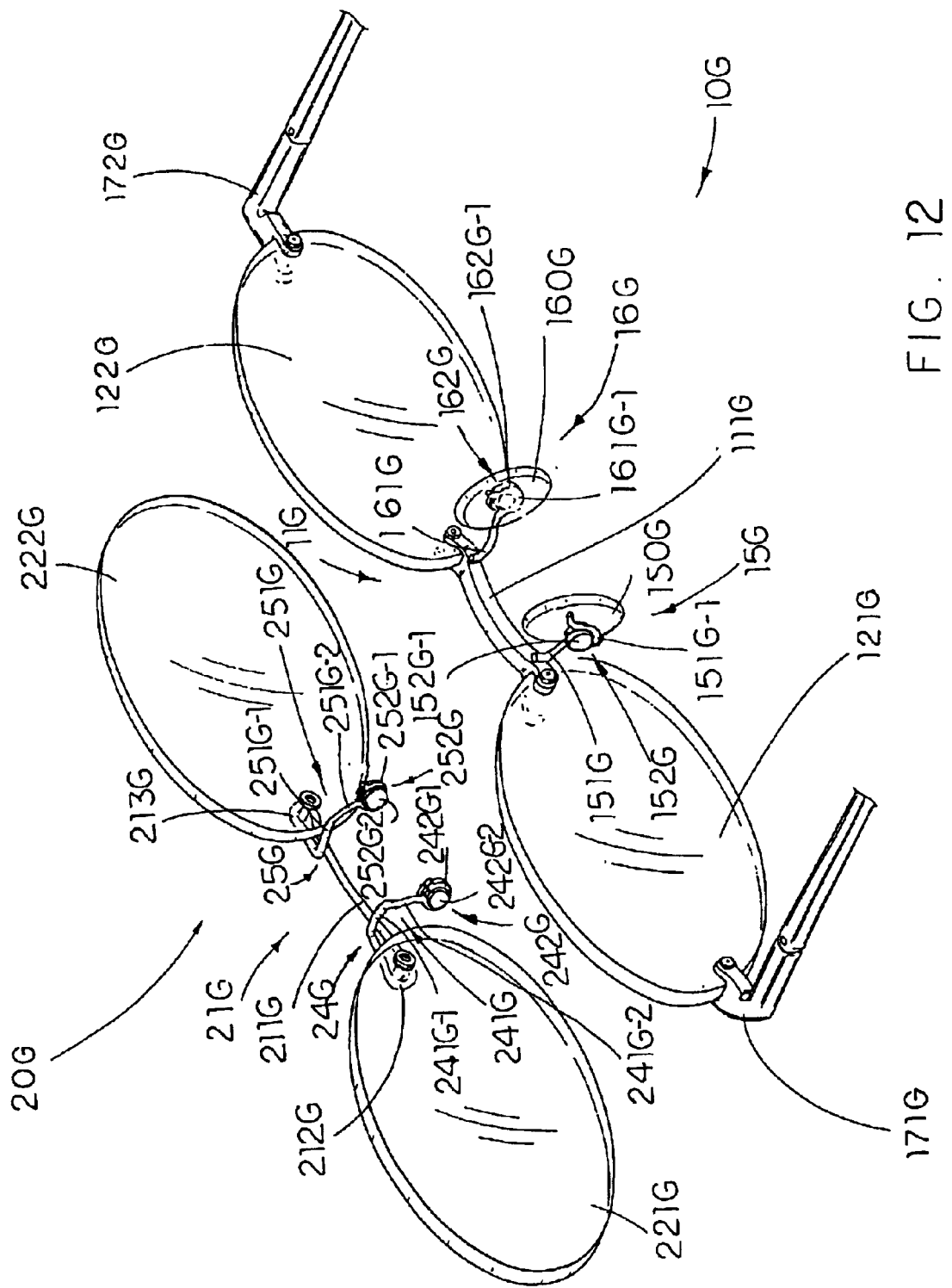
FIG. 12 is a perspective view of a spectacles set with detachable shelter frame according to a ninth alternative mode of the above preferred embodiment of the present invention.

Referring to FIG. 12, a ninth alternative mode of the above preferred embodiment is disclosed to illustrate how to apply the magnetic attachment arrangements 24G, 25G of the present invention to a rimless detachable shelter frame 20G and the magnetic holders 152G, 162G of the present invention to a rimless primary spectacle frame 10G, wherein the attraction and engagement concept and structure of the ninth alternative mode is same as the above preferred embodiment. The detachable shelter frame 20G in the above embodiment and its alternative modes can also be used for mounting in front of the rimless primary spectacle frame 10G, wherein the two side extensions 171G, 172G and the primary bridge 111G are directly fastened to the edges of the two lenses 121G, 122G.

The primary bridge 111G is connected between the two lenses 121G, 122G by means of two nuts for fastening two ends of the primary bridge 111G at two edges of the lenses 121G, 122G respectively. The two nose supports 14G, 15G comprises a supporting member 150G, 160G, an extension arm 151G, 161G, and a magnetic holder 152G, 162G. Each of the extension arms 151G, 161G has one end connected to the primary bridge 111G and another end downwardly extended from the primary bridge 111G to form a U-shaped end holder 151G-1, 161G-1, such as a conventional spectacle frame, for holding the holding head of the supporting member 150G, 160G in position.

The magnetic holders 152G, 162G are built in the two supporting members 150G, 160G of the two nose supports 15G, 16G respectively so that when the two supporting members 150G, 160G are fastened to the end holders 151G-1, 161G-1 of the two extension arms 151G, 161G respectively, said two magnetic holders 152G, 162G are mounted in position at the same time. Each of the magnetic holders 152G, 162G comprises a holder member 152G-1, 162G-2 which is protruded from an inner side of the respective supporting member 150G, 160G and made of magnet or a kind of metal having magnetic attraction ability such as mild steel, low carbon steel and high grade steel, which is attractive to magnetic material such as permanent magnet.

The rimless detachable shelter frame 20G comprises a shelter frame 21G which merely comprises a shelter bridge 211G which two ends formed two mounting loops 212G, 213G and continuously extended rearwardly to form the two L-shaped supporting arms 241G, 251G of the two magnetic attachment arrangements 24G, 25G. The shelter bridge is supported and extended between two shelter lenses 221G, 222G by fastening the two mounting loops 212G, 213G at two inner sides of the two shelter lenses 221G, 222G respectively.

Each of the magnetic attachment arrangements 24G, 25G also comprises a magnetic seats 242G, 252G which includes a magnet holder 242G-1, 252G-1 and a magnet element 242G-2, 252G-2. Each of the supporting arms 241G, 251G includes a riding portion 241G-1, 251G-1 integrally and rearwardly extended from the respective mounting loop 212G, 213G and a mounting portion 241G-2, 251G-2 downwardly extended from the riding portion 241G-1, 251G-1. The bottom ends of the two mounting portions 241G-2, 251G-2 form two U-shaped holding loops to function as the magnet holders 242G-1, 252G-1 respectively. The two magnet elements 242G-2, 252G-2 are circular bodies made of magnets. The magnet holders 242G-1, 252G-1 are engaged around the magnet elements 242G-2, 252G-2 so as to support the two magnet elements 242G-2, 252G-2 in position wherein an attraction surface of each of the magnet elements 242G-2, 252G-2 is facing inwards. Each of the magnet elements 242G-2, 252G-2 can be adjusted to a vertical position or an inclined position with a desired angle by bending the respective supporting arms 241G, 251G so as to match with the corresponding positions of the two magnetic holders 152G, 162G.

To securely mount the detachable shelter 20G in front of the primary spectacle frame 10G, the two supporting arms 241G, 251G are extended rearwardly to ride on the primary bridge 111G and the magnetic seats 242G, 252G are supported either vertically or inclinedly with the magnet elements 242G-2, 252G-2 facing inwards to magnetically attach to the attraction surfaces of the two magnetic members 152G-2, 162G-2 of the two magnetic holders 152G, 162G of the primary spectacle frame 10G so as to hold the shelter frame 21G of the detachable shelter frame 20G on the frame body 11G of the primary spectacle frame 10G in position.

In view of above, a conventional rimless spectacle frame can be used as the primary spectacle frame 10G of the present invention by using the supporting members 150G, 160G that provide with the magnetic holders 142G, 152G.

While the foregoing description and diagram describe the preferred embodiment and its alternatives, it should be appreciated that certain obvious modifications, variations, and substitutions may be made without departing from the spirit and scope of the present invention, such as the shape and size of the magnetic seat and the magnetic holder. Moreover, the magnets can be provided at the magnetic holders respectively while the magnetic seats are made of non-magnetic material or soft-magnetic metal having magnetic attraction ability so as to enhance the magnetic engagement between the shelter frame and the primary spectacle frame.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A spectacles set, comprising:

a primary spectacle frame which comprises a frame body for mounting a pair of lenses in position, wherein said frame body comprises a primary bridge connected between said two leases, two nose supports attached at two inner sides of said leases respectively, two magnetic holders each of which has magnetic attraction ability being provided at said two noes supports respectively, and two suds extensions provided at two outer sides of said lenses for coupling a pair of temples respectively; and a detachable shelter frame adapted for mounting in front of said primary spectacle frame, wherein said detachable shelter frame comprises a shelter frame for supporting two auxiliary lenses and a pair of magnetic attachment arrangements connected to said shelter frame, wherein each of said magnetic attachment arrangements comprises a supporting arm extending rearwardly from said shelter frame towards said respective magnetic holder for riding on said primary bridge so as to securely mount said shelter frame in front of said primary spectacle frame and a magnetic seat which is connected to said supporting arm and extended to magnetically attach said respective magnetic holder of said primary spectacle frame so as to hold said shelter frame on said primary spectacle frame in position.

2. The spectacles set, as recited in claim 1, wherein said shelter frame includes shelter bridge connected between said two auxiliary lenses and each of said supporting arms of said magnetic attachment arrangements has a riding portion rearwardly extended from said shelter bridge for tiding on said primary bridge of said primary spectacle frame and a mounting portion downwardly extended front said riding pardon to support said magnetic sat thereof to attach with said respective magnetic holder of said primary spectacle frame.

3. The spectacles set, as recited in claim 2, wherein each of said magnetic seats comprises a magnetic housing rearwardly extended front sold respective supporting arm and a magnetic mounted in said magnetic housing, which is arranged to face toward and align with said respective magnetic holder of said shelter frame when said detachable shelter frame is mounted in front of said primary spectacle frame.

4. The spectacles set, as recited in claim 1, wherein each of said nose supports includes a supporting member and an extension arm which has a distal end portion connected to said supporting member and a root end portion attached to said frame body, wherein said magnetic holders are formed at said root end portions of said extension arms, wherein at lease a top portion of each of said magnetic holders is made of a kind of metal having magnetic attraction ability.

5. The spectacles set, as recited in claim 4, wherein each of said magnetic holders further comprises an interlocking member upwardly protruded and made of a kind of metal having magnetic attraction ability.

6. The spectacles set, as recited in claim 5, wherein each of said magnets has a thickness smaller than a depth of said respective magnetic housing so as to define an engaging groove when said magnet is embedded in said magnetic housing for fittedly engaging with said interlocking member of said respective magnetic.

7. The spectacle set, as recited in claim 3, wherein each of said two nose supports comprises a supporting member and a magnetic holder which comprises a holder member and a magnetic member, wherein said two holder members are formed by horizontally extending and bending said two root end portions of said extension arms of said nose supports to form two U-shaped loop portions respectively to hold said two magnetic members in position.

8. The spectacles set, as recited in claim 7, wherein each of said two magnetic members has a narrowed neck for engaging with said respective holder member.

9. The spectacles set, as recited in claim 8, wherein each of said magnets has a thickness smaller than a depth of said respective magnetic housing so as to define an engaging groove when said magnet is embedded in said magnetic housing for fittedly engaging with said magnetic member of said respective magnetic holder.

10. The spectacles set, as recited in claim 2, wherein each of said nose supports includes a supporting member and an extension arm which has one end connected with said supporting member and another end attached to said frame body, wherein each of said extension arms is made in reverse U-shape to form two top shoulders to function as said two magnetic holders respectively.

11. The spectacles set, as recited in claim 10, wherein each of said magnetic seats comprises a magnetic housing downwardly and suspendedly affixed to a bottom and of said mounting portion of said respective supporting arm, wherein each of said magnetic housing made of magnetic attractable material, is a reverse U-shaped body defining an engaging groove, wherein in order to mount said detachable shelter frame in front of said primary spectacle frame, said magnetic seats are attached to said two magnetic holders by engaging said two top shoulders of said two magnetic holders in said two engaging grooves respectively.

12. The spectacles set, recited an claim 10, wherein each of said magnetic seats comprises a magnetic housing downwardly and suspendedly affixed to a bottom end of said mounting portion of said respective supporting arm, wherein each of said magnetic housing is a reverse U-shaped body defining an engaging groove, wherein in order to mount said detachable shelter frame in front of said primary spectacle frame, said magnetic seats are attached to said two magnetic holders by engaging said two top shoulders of said two magnetic holders ta said two engaging grooves respectively, wherein each of said magnetic seats further comprises a magnet mounted at a bottom of said engaging groove of said magnetic housing so as to provide magnet fields present around said two magnets for not only guiding said magnetic seats toward and aligning with said magnetic holders and to ensure said magnetic seats firmly attached with said magnetic holders respectively.

13. The spectacles set, as recited in claim 10, wherein two engaging members, made of magnetically attachable material, are upwardly protruded on said two reverse U-shaped top shoulder of said two magnetic holders respectively, wherein each of said magnetic seats comprises a magnetic housing rearwardly extended from said respective supporting arm and a magnet mounted in said magnetic housing, which is arranged to face toward and align with said respective magnetic holder of said shelter frame when said detachable shelter frame is mounted in front of said primary spectacle frame.

14. The spectacles set, as recited in claim 2, wherein each of said extension arms is made in reverse U-shape to form a ring shape holder, made of magnetically attractable materials, to function said magnetic holder, wherein said magnetic seat, which is a magnet, is connected to said supporting arm end arranged to magnetically attach to said magnetic holder of said primary spectacle frame so as to hold said shelter frame of said detachable shelter frame on said frame body of said primary spectacle frame in position.

15. The spectacles set, as recited in claim 14, wherein a holder hole is formed, on each of said magnetic holders and each or said magnetic seats further comprises an engagement tip integrally protruded from a bottom end thereof, wherein each of said engagement tips has a diameter smaller than said magnetic seat and slightly smaller than said holder hole, wherein when said shelter frame is mounted in front of said primary spectacle frame, said two magnetic seats magnetically attract with said two magnetic holders respectively and said two engagement tips are inserted into said two holder holes respectively so as firmly engaged said magnetic holders with said two magnetic holders.

16. The spectacles set, as recited in claim 2, wherein said magnetic holders of said two nose supports are made from said two extension arms respectively, wherein each of said extension arms has a reverse U-shape that forms an upper loop portion and each of said magnetic holders comprises a holder member which is said upper loop portion of said extension arm and a magnetic member firmly mounted on said respective holder member.

17. The spectacles set, as recited in claim 16, wherein said two magnetic members are circular bodies having magnetic attraction ability, wherein said holder members are engaged around said magnetic members so as to support said two magnetic members in position wherein an attraction surface of each of said magnetic members is facing outwards, wherein each of said magnetic seats comprises a magnetic housing and a magnet embedded in said magnetic housing, wherein said magnetic seats are supported facing inwards to magnetically attach to said attraction surfaces of said two magnetic members of said two magnetic holders of said primary spectacle frame so as to hold said shelter frame of said detachable shelter frame on said frame body of said primary spectacle frame in position.

18. The spectacles set, as recited in claim 2, wherein said magnetic holders which are made from said two extensions respectively are arranged in a bottom position of said two extension supports, wherein each of said extension arms of said nose supports of said primary spectacle frame has a U-shape that forms a lower loop portion, wherein each of said magnetic holders comprises a holder member which is said U-shaped lower loop portion of said extension arm and a magnet member firmly mourned on said respective holder member.

19. The spectacles set, as recited an claim 18, wherein said two magnetic members are circular bodies having magnetic attraction ability, wherein said holder members are engaged around said magnetic members so as to support said two magnetic members in position wherein an attraction surface of each of said magnetic members is facing outwards, wherein each of said magnetic mis comprises; magnetic housing and a magnet embedded in said magnetic housing, wherein said magnetic seats are supported facing inwards to magnetically attach so said attraction surfaces or said two magnetic members of said two magnetic holders of said primary spectacle frame so as to hold said shelter frame of said detachable shelter frame on said frame body of said primary spectacle frame in position.

20. The spectacles set, as recited in claim 3, wherein each of said two nose supports comprises a supporting member and an extension arm extended between said supporting member and said primary spectacle frame for supporting said supporting member, wherein said two magnetic holders are provided at an upper portion of said two extension arms of said two nose supports, wherein each of said magnetic holders is a holder member integrally connected to said upper portion of said respective extension arm and has an attraction surface facing upwards.

21. The spectacles set, as recited in claim 20, wherein said magnetic holders are made of magnetic attracting materials for magnetically attracting with said two magnetic seats.

22. The spectacles set, as recited in claim 20, wherein each of said magnetic holders is made of non-magnetic material and a magnet is embedded on each of said magnetic seats for magnetically attracting with said respective magnetic seat.

23. The spectacles sate as recited in claim 2, wherein each of said two riding portions of said two supporting arms comprises a section of elastic element to provide elastic ability for better holding said detachable shelter frame in position by pulling said detachable shelter frame towards said primary spectacle frame after said detachable shelter frame is mounted in front of said primary spectacle frame.

24. The spectacles set, as recited in claim 2, wherein said magnetic holders are built in said two supporting members of said two nose supports respectively so that when said two supporting members are fastened to said end holders of said two extension arms respectively, said two magnetic holders are provided at an upper portion of said nose supports.

25. The spectacles eel, as recited in claim 24, wherein each of said magnetic holders comprises a holder member protruded from an inner side of said respective supporting member and a connecting member for detachably fastening to said respective end holder, wherein when said holder members are made of magnetic attraction material, said magnetic seats are attracted thereto.

26. The spectacles set, as recited in claim 25, wherein each of said magnetic holders further comprises an interlocking member upwardly protruded from said holder member for further engaging with said magnetic seats.

27. The spectacles set, as recited in claim 3, wherein said magnetic holders are built in said two supporting members of said two nose supports respectively so that when said two supporting members are fastened to said end holders of said two extension arms respectively, said two magnetic holders are provided at an upper portion of said nose supports.

28. The spectacles set, as recited in claim 27, wherein each of said magnetic holders comprises a holder member protruded from an inner side of said respective supporting member and a connecting member for detachably fastening to said respective end holder, wherein when said holder members are made of magnetic attraction material, said magnetic seats are attracted thereto.

29. The spectacles set, as recited in claim 28, wherein each of said magnetic holders further comprises an interlocking member upwardly protruded from said holder member for further engaging with said magnetic seals.

30. The spectacles set, as recited in claim 1, wherein said two nose supports comprises a supporting member, an extension arm and a magnetic holder, wherein each of said extension arms has one end connected to said primary bridge and another end downwardly extended from said primary bridge to form a U-shaped end for holding said holding head of said supporting member in position.

31. The spectacles set, as recited in claim 30, wherein said magnetic holders are built in said two supporting members of said two nose supports respectively and each of said magnetic holders comprises a holder member which is protruded from art inner side or said respective supporting member and made of magnetic attracting, wherein when said two supporting members are fastened to said end holders of said two extension arms respectively, said two magnetic holders are mounted position.

32. The spectacles set, as recited in claim 1, wherein each of said magnetic seats includes a magnet holder and a magnet element and each of said supporting arms includes a riding portion integrally and rearwardly extended from said shelter bridge and a mounting portion downwardly extended from said riding portion, wherein bottom ends of sold two mounting portions form two U-shaped holding loops to function as said magnetic holders respectively.

33. The spectacles set, as recited in claim 32, wherein said two magnet element are made of magnets and said magnet holders are engaged around said magnet elements so as to support said two magnet elements in position wherein an attraction surface of each of said magnet elements is facing inwards.

34. The spectacles set, as recited in claim 33, wherein two ends of said shelter bridge form two mounting loops and continuously extend rearwardly to form said two supporting arms of said two magnetic attachment arrangements, wherein said shelter bridge is supported and extended between said two shelter lenses by fastening said two mounting loops as two inner sides of said two shelter lenses respectively.

35. The spectacles set, as recited in claim 30, wherein said detachable shelter flame is a rimless frame comprising two shelter lenses and a shelter bridge supported and extended between said two shelter lenses, wherein each of said magnetic seats includes a magnet holder and a magnet element and each of said supporting arms include a riding portion integrally and rearwardly extended from said shelter bridge and a mounting portion downwardly extended from said riding portion, wherein bottom ends of said two mounting portions form two U-shaped holding loops to function as said magnet holders respectively.

36. The spectacles set, as recited in claim 35, wherein said two magnet element are made of magnets and said magnet holders are engaged around said magnet elements so as to support said two magnet elements in position wherein an attraction surface of each of said magnet elements is facing inwards.

37. The spectacles set, as recited in claim 36, wherein two ends of said shelter bridge form two mounting loops and continuously extend rearwardly to form said two supporting arms of said two magnetic attachment arrangements, wherein said shelter bridge is supported and extended between said two shelter lenses by fastening said two mounting loops at two inner sides of said two shelter lenses respectively.

38. The spectacles set, as recited in claim 31, wherein said detachable shelter frame is a rimless frame comprising two shelter lenses and a shelter bridge supported and extended between said two shelter lenses, wherein each of said magnetic seats includes a magnet holder and a magnet element and each of said supporting anus includes a riding portion integrally and rearwardly extended from said shelter bridge and a mounting portion downwardly extended from said riding portion, wherein bottom ends of said two mounting portions form two U-shaped holding loops to function as said magnet holders respectively.

39. The spectacles set, as recited in claim 38, wherein said two magnet element are made of magnets and said magnet holders are engaged around said magnet elements so as to support said two magnet elements in position, wherein an attraction surface of each of said magnet elements is facing inwards.

40. The spectacles set, as recited in claim 39, wherein two ends of said shelter bridge form two mounting loops and continuously extend rearwardly to form said two supporting arms of said two magnetic attachment arrangements, wherein said shelter bridge is supported and extended between said two shelter lenses by fastening said two mounting loops at two inner sides of said two shelter lenses respectively.

\* \* \* \* \*